United States Patent
Isono

(10) Patent No.: US 8,567,216 B2
(45) Date of Patent: Oct. 29, 2013

(54) MANUFACTURING METHOD OF A SHEET GLASS MATERIAL FOR MAGNETIC DISK, MANUFACTURING METHOD OF A GLASS SUBSTRATE FOR MAGNETIC DISK

(75) Inventor: Hideki Isono, Kofu (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/362,256

(22) Filed: Jan. 31, 2012

(65) Prior Publication Data

US 2013/0025321 A1    Jan. 31, 2013

Related U.S. Application Data

(60) Provisional application No. 61/437,967, filed on Jan. 31, 2011.

(51) Int. Cl.
*C03B 11/00*    (2006.01)

(52) U.S. Cl.
CPC ............. *C03B 11/00* (2013.01); *C03B 2215/70* (2013.01)
USPC .................................................. 65/66; 65/61

(58) Field of Classification Search
CPC ...... C03B 11/06; C03B 11/08; C03B 11/088; C03B 35/00; C03B 35/005; C03B 2215/70
USPC ........................................ 65/66; 264/1.1, 2.7
See application file for complete search history.

(56) References Cited

U.S. PATENT DOCUMENTS

| | | | | |
|---|---|---|---|---|
| 3,529,980 A | * | 9/1970 | Bromer et al. | 501/61 |
| 3,900,328 A | * | 8/1975 | Parsons et al. | 501/11 |
| 5,275,637 A | * | 1/1994 | Sato et al. | 65/66 |
| 2005/0204777 A1 | | 9/2005 | Mori et al. | |

FOREIGN PATENT DOCUMENTS

| | | | | |
|---|---|---|---|---|
| JP | 01212240 A | * | 8/1989 | |
| JP | 3709033 B2 | | 8/2005 | |

* cited by examiner

*Primary Examiner* — Matthew Daniels
*Assistant Examiner* — Cynthia Szewczyk
(74) *Attorney, Agent, or Firm* — Global IP Counselors, LLP

(57) ABSTRACT

A manufacturing method of a glass substrate for magnetic disk including a pair of principal surfaces is disclosed The method includes the steps of: dropping process for dropping a lump of molten glass; pressing process for forming a sheet glass material by sandwiching simultaneously the lump from both sides of the dropping path of the lump with surfaces of the pair of dies facing together, and performing press forming to the lump; and machining process for machining the sheet glass material, wherein the press forming sandwiches the lump while moving the pair of dies in the direction of drop of the lump so that relative speed of the lump to that of the pair of dies approaches zero.

6 Claims, 9 Drawing Sheets

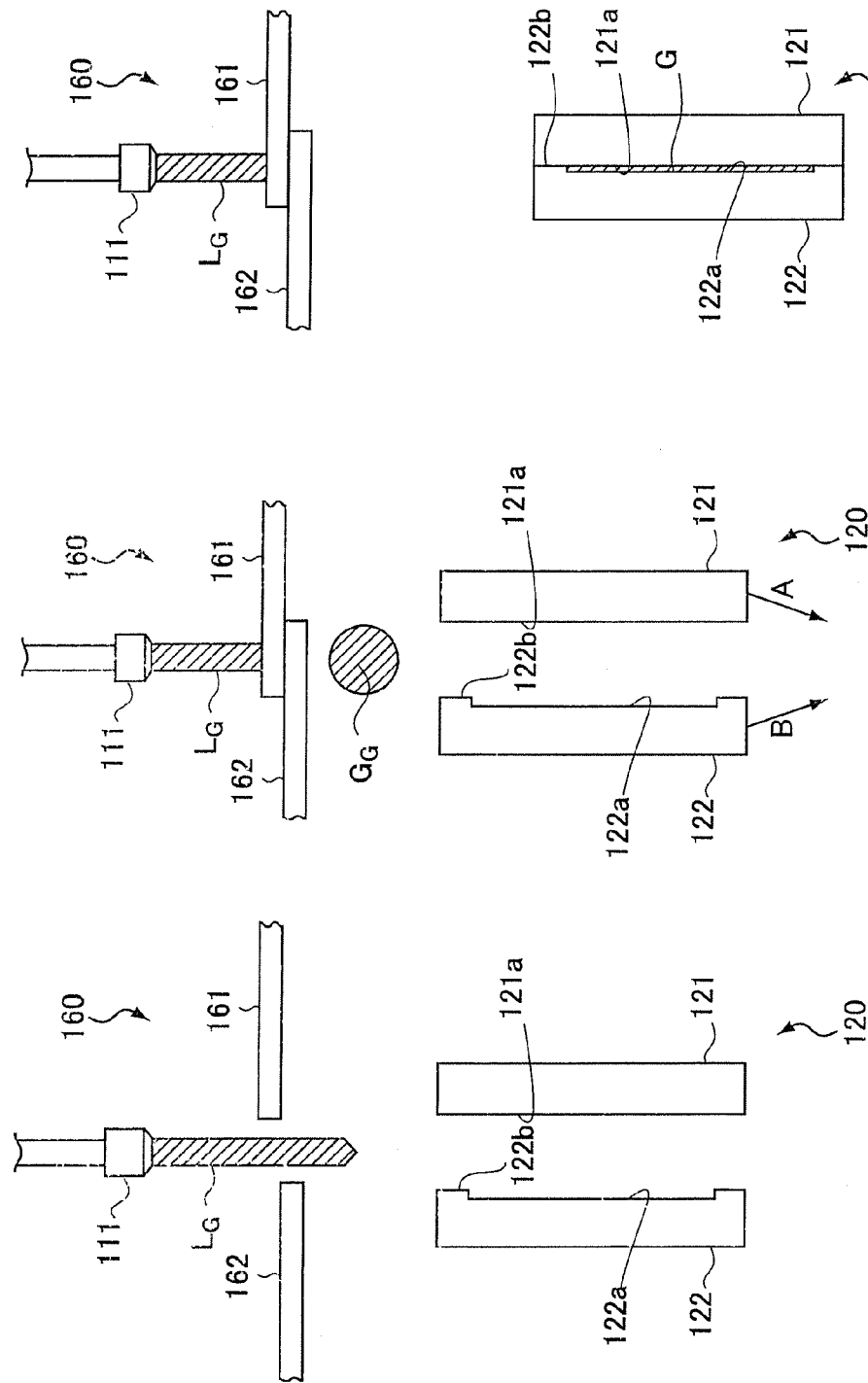

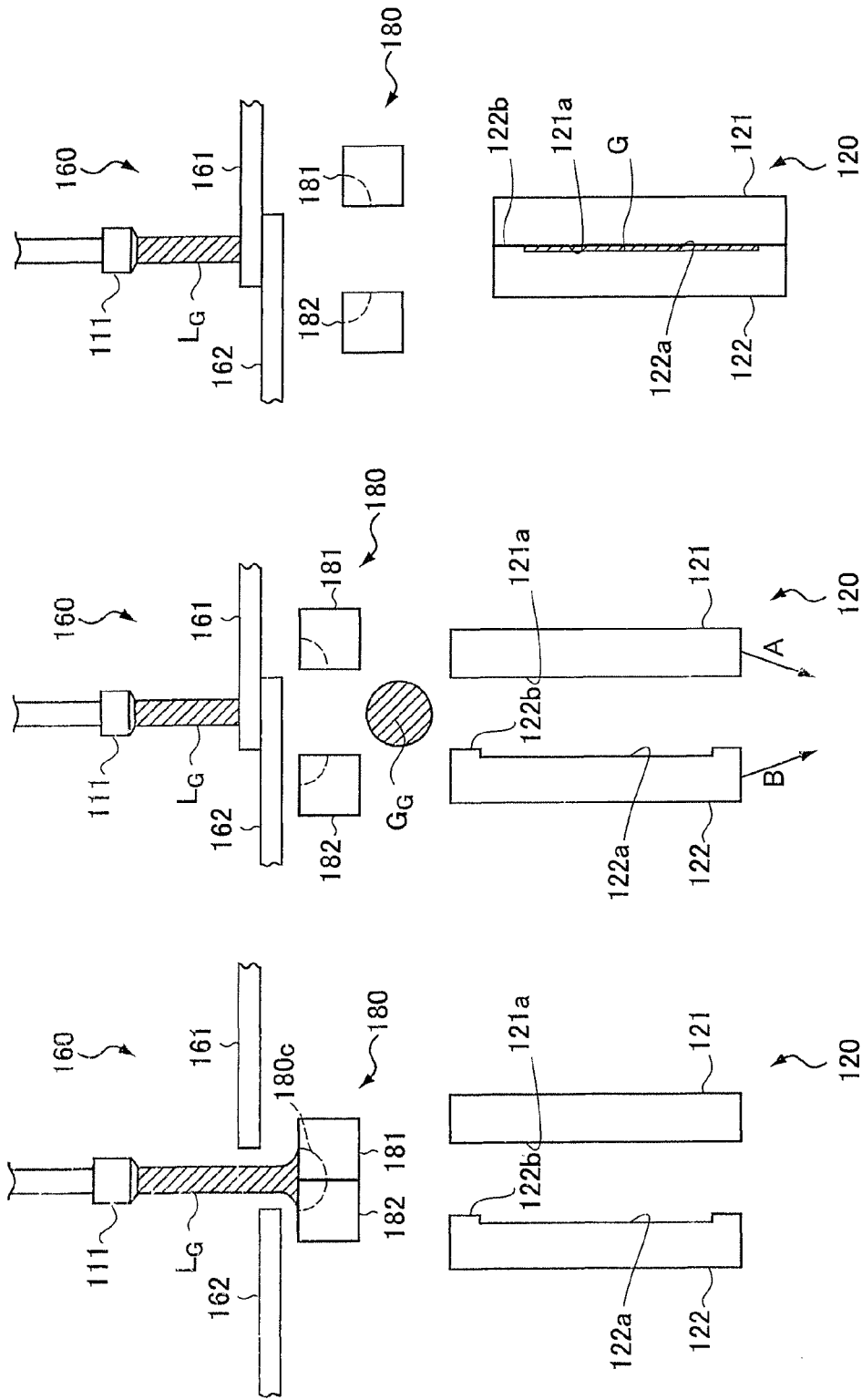

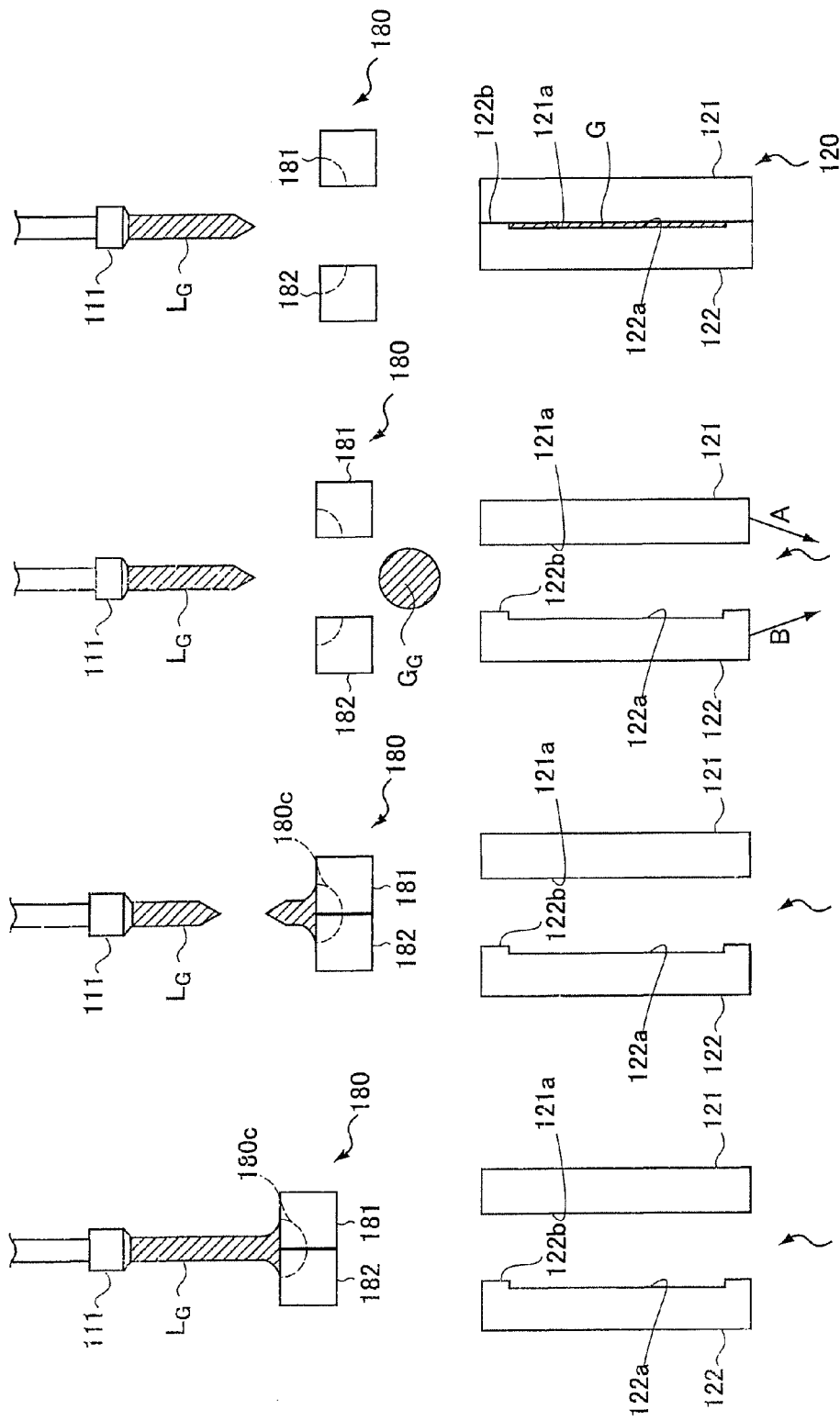

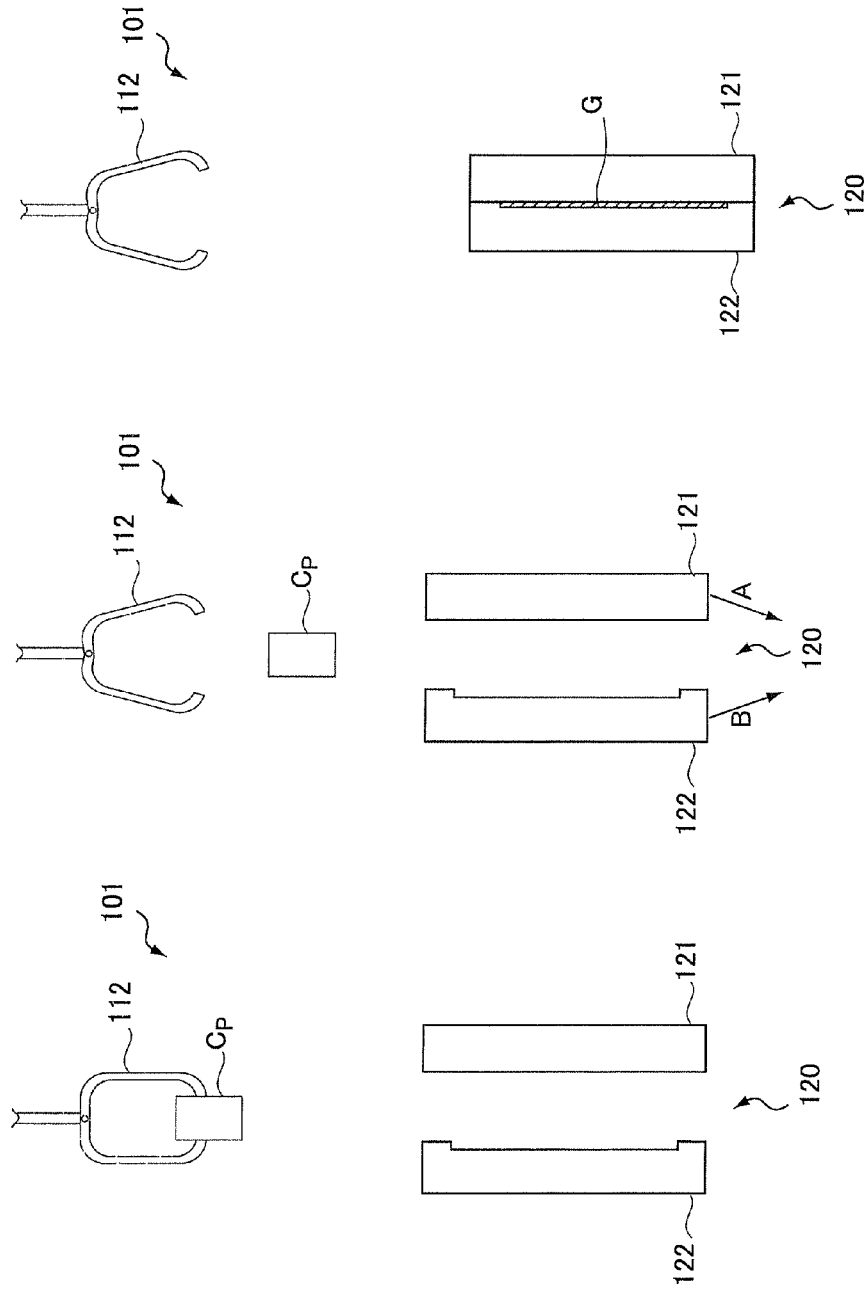

MANUFACTURING METHOD OF A SHEET GLASS MATERIAL FOR MAGNETIC DISK, MANUFACTURING METHOD OF A GLASS SUBSTRATE FOR MAGNETIC DISK

CROSS-REFERENCE TO RELATED APPLICATION

This application is based upon and claims the benefit of priority of the U.S. Provisional Application No. 61/437,967 filed in the US Patent and Trademark Office on Jan. 31, 2011, the entire contents of which are incorporated herein by reference.

FIELD

The present invention relates to a manufacturing method of a glass substrate for magnetic disk having a pair of principal surfaces.

BACKGROUND

Recently, a hard disk device is incorporated in a personal computer, a notebook personal computer, and a DVD (Digital Versatile Disc) recording apparatus in order to record data. Particularly, in the hard disk device used in an apparatus such as the notebook personal computer based on portability, a magnetic disk in which a magnetic layer is provided on a glass substrate is used, and magnetic recording information is recorded in or read from a magnetic layer using a magnetic head (DFH (Dynamic Flying Height) head) that is slightly floated on a surface of the magnetic disk surface. A glass substrate is suitably used as the substrate for the magnetic disk because a glass substrate is hardly plastically deformed compared with a metallic substrate.

The magnetic recording density is being increased in order to respond to a demand for an increase of a storage capacity in the hard disk device. For example, a magnetic recording information area is finely formed using a perpendicular magnetic recording system in which a magnetization direction of the magnetic layer is oriented toward a direction perpendicular to the substrate surface, which allows the storage capacity to be increased in a single disk substrate. In order to respond to the further increase of the storage capacity, a floating distance of the magnetic head from the magnetic recording surface is extremely shortened to form the fine magnetic recording information area. With such substrate of the magnetic disk, the magnetic layer is formed flat such that the magnetization direction of the magnetic layer is oriented toward the direction substantially perpendicular to the substrate surface. Therefore, the glass substrate is formed such that surface irregularity of the glass substrate is decreased as much as possible.

The shortened floating distance of the magnetic head may easily cause a head crush trouble or a thermal asperity trouble. Because these troubles are caused by the micro irregularity or a particle on the magnetic disk surface, the glass substrate is formed such that the surface irregularity of an end face is also decreased as much as possible in addition to that of the principal surface.

For example, the glass substrate used in the magnetic disk is manufactured by the following method: specifically, a glass gob made of molten glass (a lump of the glass material) is supplied onto a lower die that is a backing gob forming die; press forming is performed to the glass gob to prepare a sheet glass material using the lower die and an upper die that is a counter gob forming die; and the sheet glass material is formed into a glass substrate for information recording medium (for example, see Japanese Patent No. 3709033).

With the method disclosed in Japanese Patent No. 3709033, after the glass gob made of the molten glass is supplied onto the lower die, the following steps are performed: a lower surface of a body for upper die and an upper surface of a body for lower die are abutted on together; a thin sheet glass forming space is formed outside a sliding surface between the upper die and the body for upper die and a sliding surface between the lower die and the body for lower die; the upper die is moved down to perform the press forming; and the upper die is moved up immediately after the press forming. Therefore, the sheet glass material that becomes a base of the glass substrate for magnetic disk is formed. Then, the glass substrate for magnetic disk is obtained after a grinding process and a polishing process.

In the grinding process, for example, grinding is performed using alumina loose abrasive grains. In the grinding process, a first grinding process and a second grinding process are performed using the loose abrasive grains having different particle sizes. A particle size of the loose abrasive grain used in the second grinding process is set smaller than that of the loose abrasive grain used in the first grinding process. Therefore, the coarse grinding and the fine grinding are performed in this order.

The polishing process includes a first polishing process in which the loose abrasive grain such as cerium oxide and a hard resin material polisher are used and a second polishing process in which colloidal silica and a soft resin material polisher are used. The particle size of the abrasive grain used in the first polishing process is smaller than that of the abrasive grain used in the second grinding process of the grinding process. The particle size of the abrasive grain used in the second polishing process is smaller than that of the abrasive grain used in the first polishing process.

Thus, in the surface processing of the glass substrate, the first grinding process, the second grinding process, the first polishing process, and the second polishing process are performed in this order, and the glass substrate is formed such that accuracy of surface quality such as surface roughness of the glass substrate is gradually enhanced.

However, the surface accuracy of the glass substrate formed by the conventional method is not enough for the surface accuracy of the principle surfaces for the high density of the magnetic recording and the fine magnetic recording information area.

For example, in forming the sheet glass material, a mold release agent is applied to the die surface in order to prevent the glass material from fusing to the die surfaces of the upper die and lower die. The surface roughness of the principal surface of the sheet glass material is increased because of the mold release agent. There is a large surface temperature difference between the upper die and the lower die, and the lower die to which the glass gob (a lump of the glass material) is supplied becomes high temperature. Because the surface temperature difference causes a temperature distribution in a thickness direction of the formed sheet glass material and in a plane of the plate, a shrinkage quantity of the sheet glass material that is taken out from the die and cooled also has a distribution in the thickness direction of the formed sheet glass material and in the plane of the plate. The sheet glass material is easy to warp, and therefore good flatness of the formed sheet glass material is not achieved.

The flatness of the sheet glass material can be improved by the grinding (first grinding process). For example, in the grinding process, a machining allowance (ground quantity) is increased in order to improve the flatness. However, when the machining allowance is increased in the grinding process, a deep crack may be generated in the surface of the sheet glass material. Therefore, in the polishing process that is a post-process, the machining allowance (polishing quantity) is also inevitably increased in an attempt to eliminate the deep crack. However, when the machining allowance is increased in the polishing process in which the loose abrasive grains and the resin polisher are used, the neighborhood in the outer circumferential edge portion is rounded in the principal surface of the sheet glass material to cause a "roll-off problem" of the edge portion. That is, because the neighborhood in the outer circumferential edge portion is rounded in the sheet glass material, a distance between the magnetic layer and the magnetic head in the neighborhood of the outer circumferential edge portion becomes larger than the floating distance of the magnetic head in another portion of the glass substrate when the magnetic disk is prepared using the sheet glass material as the glass substrate. The surface irregularity is generated because the neighborhood of the outer circumferential edge portion has the rounded shape. As a result, the recording and reading operations of the magnetic head are not precisely performed in the magnetic layer in the neighborhood of the outer circumferential edge portion. This is the "roll-off problem".

When the machining allowance is increased in the polishing process, a time necessary for the polishing process is unfavorably lengthened.

SUMMARY OF THE INVENTION

In view of the above, in order to improve flatness of disk-shape glass material after press formed, the inventor has studied a method including "dropping process for dropping a lump of molten glass; pressing process for forming a sheet glass material by sandwiching simultaneously the lump from both sides of the dropping path of the lump with surfaces of the pair of dies facing together, and performing press forming to the lump". With the method, use of a mold release agent is not required, and flatness may be improved because temperature difference is not likely to occur between the pair of dies.

However, as the inventor studies, it has become clear that a manufactured disk-shaped glass material has a shape of which length in the axial direction of drop is greater than lengths in the other directions. When such irregular glass is used as a glass substrate for magnetic disk, it is necessary, in so-called scribing process, to cut the glass substrate by growing cracks from one principal surface side to the other principal surface side thereby machining the glass substrate so as to be disk-shaped. However, because particularly in-plane residue stress is uneven for the irregular glass, a direction of growth of cracks is unstable in the scribing process. Then, problems occur that chip is generated at the outer circumference of the disk-shaped glass substrate, and that yield rate is remarkably reduced. Therefore, in manufacturing a disk-shaped glass material with the above method, it has been demanded that the glass material be substantially complete round.

Further, by making the glass material substantially complete round, machining allowance for shape processing is decreased, and useless amount of material is therefore decreased. This leads to cost reduction.

When roundness of a disk-shaped glass material is for example 10 μm or less, it is not required to machine the outer circumference part of the glass material. Then, elution (alkali elution for example) of the glass component from the outer circumference part may be suppressed.

On the other hand, it has become clear that, when cutting molten glass with cutting blades in order to drop a lump of the molten glass, a cut mark may remain in the sheet glass material, and the cut mark may remain as a defect of the machined glass substrate for magnetic disk. After studying this point, it has also become clear that the situation is improved by decreasing viscosity of glass in press forming. Note that it becomes possible to reduce the pressing pressure by decreasing the viscosity. Thus, there is advantage of easiness of machining and improved productivity.

However, it has become clear that, as the viscosity of glass decreases, the above-described "shape of which length in the axial direction of drop is greater than lengths in the other directions" becomes remarkable.

In view of the above, an object of the present invention is to provide a manufacturing method for efficiently manufacturing a glass substrate for magnetic disk excellent in roundness.

In order to solve the above problem, manufacturing method of a glass substrate for magnetic disk according to the present invention is a manufacturing method of a glass substrate for magnetic disk including a pair of principal surfaces, the method comprising the steps of: dropping process for dropping a lump of molten glass; pressing process for forming a sheet glass material by sandwiching simultaneously the lump from both sides of the dropping path of the lump with surfaces of the pair of dies facing together, and performing press forming to the lump; and machining process for machining the sheet glass material, wherein the press forming sandwiches the lump while moving the pair of dies in the direction of drop of the lump so that relative speed of the lump to that of the pair of dies approaches zero.

Preferably, the relative speed of the lump to that of the pair of dies is zero with regard to velocity component in the direction of drop of the lump.

Preferably, temperatures of the pair of dies are lower than strain point of the glass.

Preferably, the glass contains, as converted based on the oxide, denoted as molar percentages: 50 to 75% $SiO_2$, 1 to 15% $Al_2O_3$, totally 5 to 35% at lease one component selected from the group of $Li_2O$, $Na_2O$, and $K_2O$, totally 0 to 20% at lease one component selected from the group of MgO, CaO, SrO, BaO, and ZnO, and totally 0 to 10% at lease one component selected from the group of $ZrO_2$, $TiO_2$, $La_2O_3$, $Y_2O_3$, $Ta_2O_5$, $Nb_2O_5$, and $HfO_2$.

Preferably, viscosity of the molten glass ranges from 500 poise to 1,050 poise.

Preferably, the machining process includes grinding process for grinding the principal surfaces using fixed abrasive grains, and polishing process for polishing the principal surfaces using loose abrasive grains after the grinding process.

BRIEF DESCRIPTION OF THE DRAWINGS

Referring now to the attached drawings which form a part of this original disclosure:

FIG. 4A is a side view illustrating an arrangement before the molten glass and a cutting unit contact;

FIG. 4B is a side view illustrating an arrangement after the cutting unit cut the molten glass;

FIG. 4C is a side view illustrating an arrangement when a pressing unit performs press forming for a lump of the molten glass;

FIG. 7A is a side view illustrating modification 1 before the molten glass and a cutting unit contact;

FIG. 7B is a side view illustrating an arrangement after the cutting unit cut the molten glass;

FIG. 7C is a side view illustrating an arrangement when the pressing unit performs press forming for a lump of the molten glass;

FIG. 8A is a side view illustrating an arrangement before a lump of molten glass is made;

FIG. 8B is a side view illustrating an arrangement before a lump of molten glass is made;

FIG. 8C is a side view illustrating an arrangement when a lump of molten glass is formed with a gob forming die;

FIG. 8D is a side view illustrating an arrangement when the pressing unit performs press forming for a lump of the molten glass;

FIG. 9A is a side view illustrating an arrangement before dropping a lump of optical glass;

FIG. 9B is a side view illustrating an arrangement in which a lump of optical glass is dropping; and FIG. 9C is a side view illustrating an arrangement when the pressing unit performs press forming for a lump of optical glass.

DESCRIPTION OF THE PREFERRED EMBODIMENTS

A manufacturing method of a glass substrate for magnetic disk according to the present invention will be described in detail below.

(Magnetic Disk and Glass Substrate for Magnetic Disk)

Figure 1A:
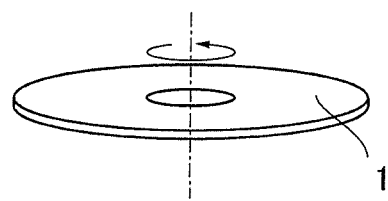
FIG. 1A is a view illustrating a magnetic disk prepared using a glass substrate for magnetic disk according to an embodiment of the invention.
Figure 1B:
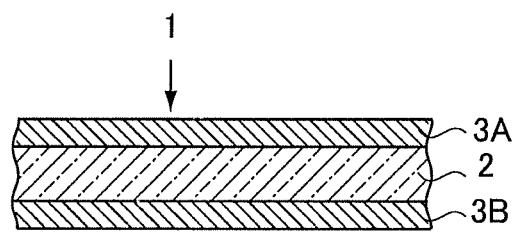
FIG. 1B is a view illustrating a section of the magnetic disk.
Figure 1C:
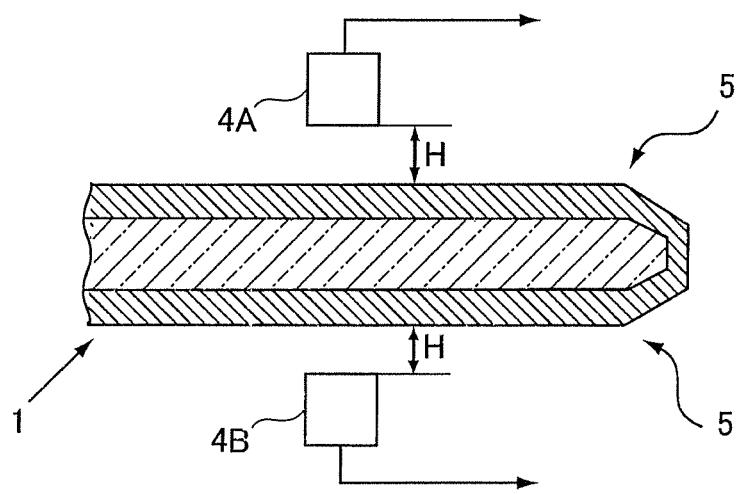
FIG. 1C is a view illustrating an arrangement in which a magnetic head is floated above the surface of the magnetic disk.

Referring now to FIG. 1A to FIG. 1C, a magnetic disk manufactured using a glass substrate for magnetic disk will be explained. FIG. 1A is a view illustrating a magnetic disk prepared using a glass substrate for magnetic disk according to an embodiment of the invention. FIG. 1B is a view illustrating a section of the magnetic disk. FIG. 1C is a view illustrating an arrangement in which a magnetic head is floated above the surface of the magnetic disk.

As illustrated in FIG. 1A, a magnetic disk 1 is a ring-shaped, and is driven around its axis of rotation. As illustrated in FIG. 1B, the magnetic disk 1 has a glass substrate 2 and at least magnetic layers 3A, 3B. The magnetic layers 3A, 3B are formed on the principal surfaces of the ring-shaped glass substrate 2.

Note that, except the magnetic layers 3A, 3B, although not illustrated, an adhesive layer, a soft magnetic layer, a non-magnetic underlying layer, the perpendicular magnetic recording layer, a protective layer, and a lubricant layer are deposited. For example, Cr alloy is applied for the adhesive layer, and the adhesive layer acts as a bonding layer to the glass substrate 2. For example, CoTaZr alloy is applied for the soft magnetic layer. For example, Ru alloy is applied for the non-magnetic underlying layer. A granular magnetic layer is applied for the perpendicular magnetic recording layer. For example, material containing carbon hydride is applied for the protective layer. Fluorine resin is applied for the lubricant layer, for example.

The magnetic disk 1 will be described with a more specific example. A CrTi adhesive layer, a CoTaZr/Ru/CoTaZr soft magnetic layer, a Ru underlying layer, a CoCrPt—$SiO_2$.$TiO_2$ granular magnetic layer, and a carbon hydride protective layer are sequentially deposited in both the principal surfaces of the glass substrate 2 with a sputtering apparatus. A perfluoropolyether lubricant layer is then deposited on the uppermost layer by a dipping method.

When used in a hard disk device, the magnetic disk 1 rotates around the axis of rotation with rotation speed of 7,200 rpm for example. As illustrated in FIG. 1C, magnetic heads 4A and 4B of a hard disk device float from surfaces of the magnetic disk 1 by a distance H because of the high speed rotation of the magnetic disk 1. The distance H is 5 nm for example. At this point, the magnetic heads 4A and 4B record and read pieces of information in and from the magnetic layers. With the floating of the magnetic heads 4A and 4B, they record and read the information in and from the magnetic layer of the magnetic disk 1 at a short distance without sliding the magnetic heads 4A and 4B onto the magnetic layer, thereby realizing a fine magnetic recording information area and high density of the magnetic recording.

A central portion of the glass substrate 2 of the magnetic disk 1 to an outer circumferential edge portion 5 are precisely processed with target surface accuracy, and the magnetic heads 4A and 4B can be therefore precisely operated while the distance H of 5 nm is maintained.

As described later, such surface irregularity of the glass substrate 2 is obtained through grinding with fixed abrasive grains with small removal stock, and through first polishing and the second polishing that therefore enable smaller removal stock.

Regarding surface irregularity of the principal surface of the glass substrate 2 used in the magnetic disk 1, flatness is 4 μm or less, and surface roughness is 0.2 nm or less. The flatness of 4 μm or less is target flatness required for the glass substrate for magnetic disk as a final product.

The flatness can be measured with a flatness tester FT-900 manufactured by NIDEK CO., LTD. for example.

The roughness of the principal surface Ra may be arithmetic average roughness Ra obtained with a scanning probe microscope (atomic force microscope) manufactured by SII Nano Technology Inc by measuring an area of 1 μm×1 μm with resolution of 512×256 pixels.

Aluminosilicate glass, soda-lime glass, and borosilicate glass can be used as a material for the glass substrate 2. Particularly, the aluminosilicate glass can be suitably used in that chemically strengthening can be performed and in that the glass substrate for, magnetic disk excellent for the flatness of the principal surface and the strength of the substrate can be prepared.

Aluminosilicate glass is preferably used containing, denoted as molar percentages: 50 to 75% $SiO_2$, 1 to 15% $Al_2O_3$, totally 5 to 35% at lease one component selected from the group of $Li_2O$, $Na_2O$, and $K_2O$, totally 0 to 20% at lease one component selected from the group of MgO, CaO, SrO, BaO, and ZnO, and totally 0 to 10% at lease one component selected from the group of $ZrO_2$, $TiO_2$, $La_2O_3$, $Y_2O_3$, $Ta_2O_5$, $Nb_2O_5$, and $HfO_2$. A glass material containing, denoted as molar percentages: 57 to 74% $SiO_2$, 0 to 2.8% $ZnO_2$, 3 to 15% $Al_2O_3$, 7 to 16% $Li_2O$, 4 to 14% $Na_2O$ as the aluminosilicate glass may be also suitably used to perform chemically strengthening.

(Manufacturing Method of a Glass Substrate for Magnetic Disk)

Figure 2:
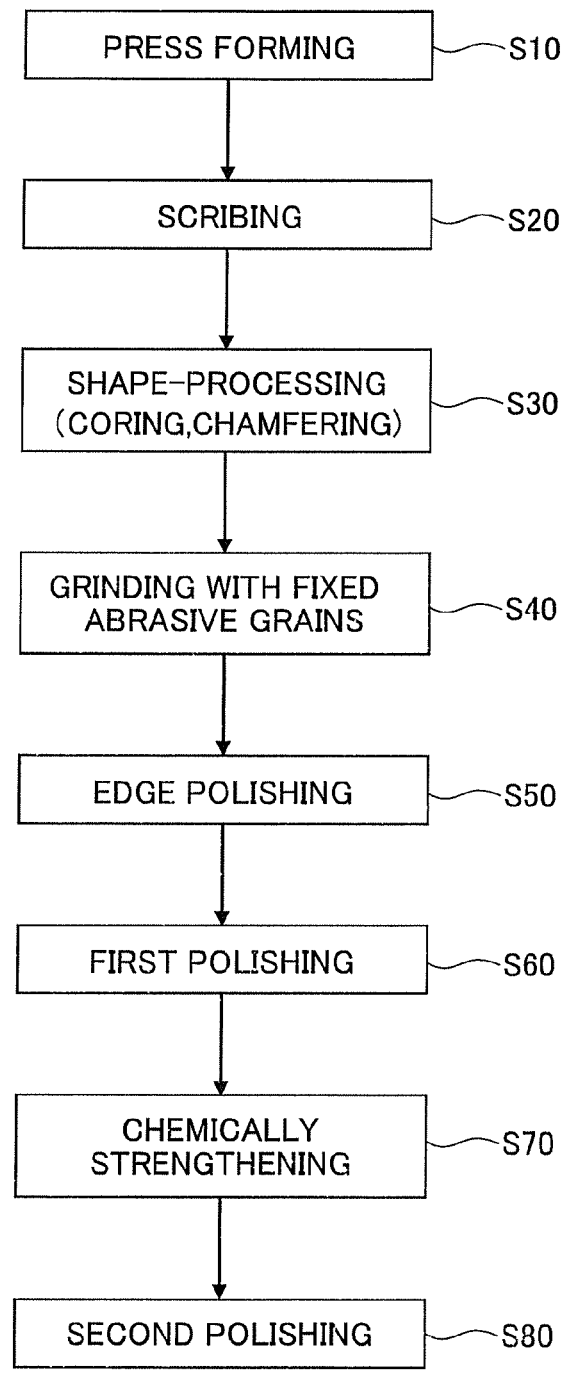
FIG. 2 is a view illustrating a flow of a manufacturing method of a glass substrate for magnetic disk according to an embodiment of the invention.

Next, with reference to FIG. 2, a flow of a manufacturing method of a glass substrate for magnetic disk will be explained. FIG. 2 is a view illustrating a flow of an embodiment of a manufacturing method of glass substrate for magnetic disk.

As illustrated in FIG. 2, a sheet glass material is manufactured by the press forming (Step S10). Next, the formed sheet glass material is scribed (Step S20). Next, the scribed sheet glass material is shape-processed (Step S30). Next, grinding is performed to the sheet glass material using fixed abrasive grains (Step S40). Then, edge polishing is performed to the sheet glass material (Step S50). First polishing is performed to the principal surface of the sheet glass material (Step S60). Next, after the first polishing, the sheet glass material is chemically strengthened (Step S70). Then, the second polishing is performed to the chemically strengthened sheet glass material (Step S80).

The detail of each process will be explained below.

(a) Press Forming Process

Figure 3:
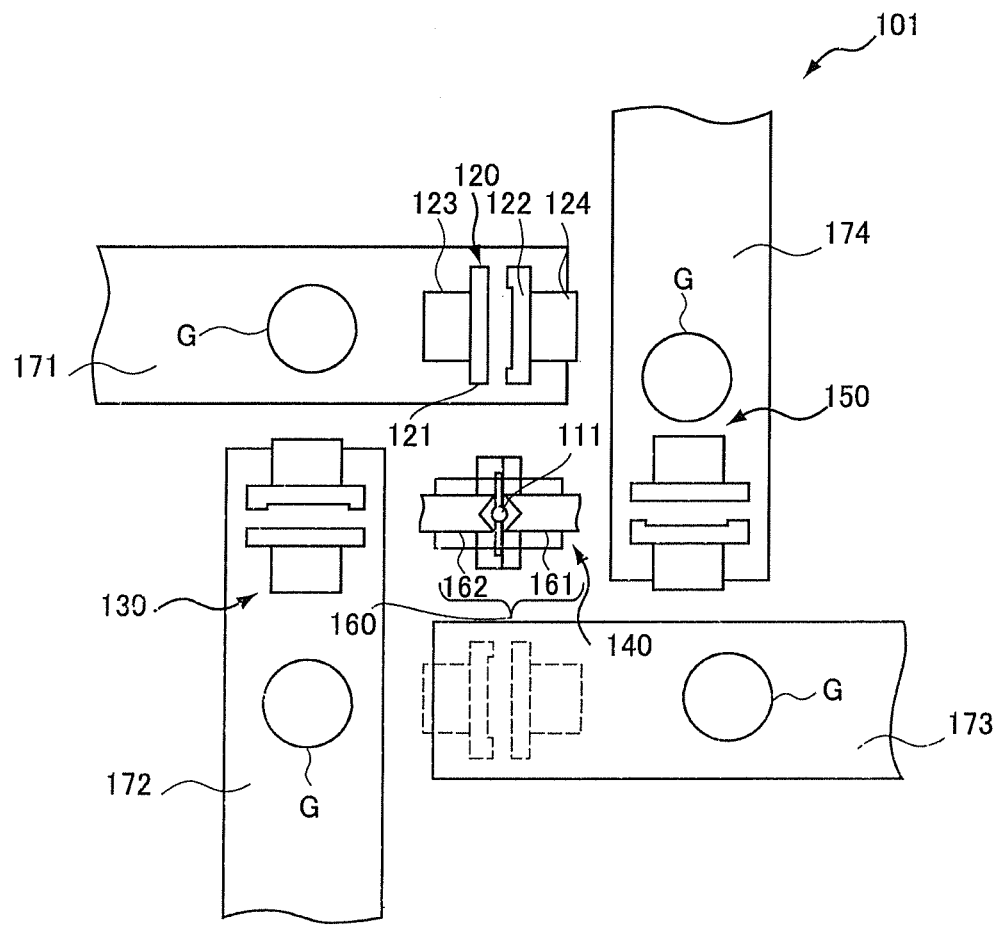
FIG. 3 is a plan view of an apparatus used in press forming.

Referring now to FIG. 3, the press forming process (Step S10) will be explained. FIG. 3 is a plan view of an apparatus used in press forming. As illustrated in FIG. 3, an apparatus 101 includes four sets of pressing units 120, 130, 140, and 150, a cutting unit 160, and a removing element 165 (not illustrated in FIG. 3).

The cutting unit 160 is provided on a path of the molten glass that flows out from a molten glass outflow port 111. A lump of the molten glass is cut by the cutting unit 160 to drop down in vertically downward direction. Each of the pressing units 120, 130, 140, and 150 sandwiches the lump of the molten glass from both sides of the dropping path of the lump with facing surfaces of a pair of dies at the same timing, thereby forming a sheet glass material.

In the example illustrated in FIG. 3, the four sets of pressing units 120, 130, 140, and 150 are provided at intervals of 90 degrees around the molten glass outflow port 111.

Here, preferably, viscosity of the molten glass ranges from 50 poise to 1,050 poise. With such viscosity, it becomes possible to form the glass material into a desired shape for a short period. When viscosity of the molten glass is smaller than 50 poise, it is difficult to generate a lump of molten glass. When viscosity of the molten glass is larger than 1,050 poise, it is difficult to press form a sheet glass blank for a short period. More preferably, viscosity of the molten glass ranges from 500 poise to 1,050 poise.

Each of the pressing units 120, 130, 140, and 150 is driven by a moving mechanism (not illustrated) so as to be able to proceed and retreat with respect to the molten glass outflow port 111. That is, each of the pressing units 120, 130, 140, and 150 can be moved between a catch position and a retreat position. The catch position (position where the pressing unit 140 is drawn by a solid line in FIG. 3) is located immediately below the molten glass outflow port 111. The retreat position (positions where the pressing units 120, 130, and 150 are drawn by solid lines in FIG. 3 and a position where the pressing units 140 is drawn by a broken line in FIG. 3) is located away from the molten glass outflow port 111.

The cutting unit 160 is provided on a path of the molten glass between the catch position and the molten glass outflow port 111. The cutting unit 160 cuts the molten glass flowing out from the molten glass outflow port 111 to obtain a proper quantity of the lump of the molten glass (hereinafter also referred to as "gob"). The cutting unit 160 includes a first cutting blade 161 and a second cutting blade 162. The first cutting blade 161 and the second cutting blade 162 are driven so as to intersect each other on the path of the molten glass at constant timing. When the first cutting blade 161 and the second cutting blade 162 intersect each other, the molten glass is cut to obtain the gob. The obtained gob drops for the catch position in the vertically downward direction.

The pressing unit 120 includes a first die 121, a second die 122, a first driving unit 123, and a second driving unit 124.

Each of the first die 121 and the second die 122 is a plate-shaped member including a surface used to perform the press forming to the gob. The first die 121 and the second die 122 are disposed such that normal directions of the surfaces become substantially horizontal, and such that the surfaces become parallel to each other.

The first driving unit 123 causes the first die 121 to proceed and retreat with respect to the second die 122. On the other hand, the second driving unit 124 causes the second die 122 to proceed and retreat with respect to the first die 121. Each of the first driving unit 123 and the second driving unit 124 includes a mechanism for causing the surface of the first driving unit 123 and the surface of the second driving unit 124 to be rapidly brought close to each other. Each of the first driving unit 123 and the second driving unit 124 is, for example, a mechanism in which an air cylinder, a solenoid and a coil spring are combined.

Because each structure of the pressing units 130, 140, and 150 is similar to that of the pressing unit 120, the descriptions of the pressing units 130, 140, and 150 are omitted.

After each pressing unit moves to the catch position, the dropping gob is sandwiched between the first die and the second die by driving the first driving unit and the second driving unit, and the gob is formed into a predetermined thickness while rapidly cooled, thereby preparing the disk-shaped sheet glass material G. Then, after the pressing unit moves to the retreat position, the first die and the second die are separated to cause the formed sheet glass material G to drop down.

A first conveyer 171, a second conveyer 172, a third conveyer 173, and a fourth conveyer 174 are provided below the retreat positions of the pressing units 120, 130, 140, and 150, respectively. Each of the first to fourth conveyers 171 to 174 receives the sheet glass material G that drops down from the corresponding pressing unit, and the conveyer conveys the sheet glass material G to an apparatus (not illustrated) of the next process.

In the present embodiment, the apparatus 101 is configured such that the pressing units 120, 130, 140, and 150 sequentially move to the catch position and move to the retreat position while the gob is sandwiched. Thus, the sheet glass material G can continuously be formed without waiting for the cooling of the sheet glass material G in each pressing unit.

Note that the sheet glass material G may be continuously be formed by sandwiching the gob by use of a single pressing unit 120. In this case, the first die 121 and the second die 122 are opened immediately after the press forming of the gob $G_G$, and press forms the subsequently dropping lump of the molten glass.

Here, referring to the side views illustrated in FIGS. 4A to 4C, the press forming process according to the present embodiment will be explained. FIG. 4A is a side view illustrating an arrangement before a molten glass material $L_G$ and a cutting unit 160 contact. FIG. 4B is a side view illustrating an arrangement after the cutting unit 160 cut the molten glass material $L_G$. FIG. 4C is a side view illustrating an arrangement when a pressing unit 120 performs press forming for a lump $G_G$ of the molten glass.

As illustrated in FIG. 4A, a molten glass material $L_G$ continuously flows out from the molten glass outflow port 111.

As illustrated in FIG. 4B, the cutting unit 160 is driven at predetermined timing to cut the molten glass material $L_G$ using the cutting blades 161 and 162. Then, the cut molten glass becomes a substantially spherical gob $G_G$ due to a surface tension thereof. In the example illustrated in FIG. 4B, an outflow quantity per time of the molten glass material $L_G$ and a driving interval of the cutting unit 160 are adjusted such that a gob $G_G$ having a diameter of about 15 mm is formed every time the cutting unit 160 is driven.

The first driving unit 123 and the second driving unit 124 are driven such that the first die 121 and the second die 122 sandwich the gob $G_G$ while moving in the direction of drop of the gob $G_G$ at the timing when the gob $G_G$ enters a gap between the first die 121 and the second die 122. More specifically, the first die 121 moves in the direction of an arrow indicated as "A" in FIG. 4B. The second die 122 moves in the direction of an arrow indicated as "B" in FIG. 4B. This allows the gob $G_G$ to be captured (caught) between the first die 121 and the second die 122, as illustrated in FIG. 4C.

Note that a projected spacer 122b is provided at the inner circumferential surface 122a of the second die 122 in order to keep the gap constant between the inner circumferential surface 121a of the first die 121 and the inner circumferential surface 122a of the second die 122.

A temperature control mechanism (not illustrated) may be preferably provided in each of the first die 121 and second die 122. Preferably, temperatures at the first die 121 and second die 122 may be maintained lower than a glass transition temperature $T_G$ of the molten glass material $L_G$.

A time until the portion of the gob $G_G$ excluding the cutting mark T is completely confined between the first die 121 and the second die 122 after the gob $G_G$ comes into contact with the inner circumferential surface 121a of the first die 121 or the inner circumferential surface 122a of the second die 122, is as extremely short as about 0.06 second. Therefore, the portion of the gob $G_G$ excluding the cutting mark T is formed into the substantially disk shape by spreading along the inner circumferential surface 121a of the first die 121 and the inner circumferential surface 122a of the second die 122 within an extremely short time, and the gob $G_G$ is rapidly cooled and solidified in the form of amorphous glass, thereby preparing the disk-shaped sheet glass material G.

Note that, in the present embodiment, for example, the formed sheet glass material G is a disk-shaped plate having a diameter of 75 to 80 mm and a thickness of about 1 mm.

After the first die 121 and the second die 122 are closed, the pressing unit 120 quickly moves to the retreat position. Then, the other pressing unit 130 moves to the catch position, and performs the pressing to the gob $G_G$.

After the pressing unit 120 moves to the retreat position, the first die 121 and the second die 122 are kept closed until the sheet glass material G is sufficiently cooled (for example, until the sheet glass material G becomes at least a temperature below a yield point). Then, the first driving unit 123 and the second driving unit 124 are driven to separate the first die 121 and the second die 122, the sheet glass material G drops down from the pressing unit 120, and the conveyer 171 located below the pressing unit 120 receives the sheet glass material G (see FIG. 3).

In the present embodiment, the first die 121 and the second die 122 are closed within a time as extremely short as 0.1 second (about 0.06 second), and the molten glass substantially simultaneously comes into contact with the whole of the inner circumferential surface 121a of the first die 121 and the whole of the inner circumferential surface 122a of the second die 122. This prevents the inner circumferential surface 121a of the first die 121 and the inner circumferential surface 122a of the second die 122 from being locally heated, and a deformation is therefore hardly generated in the inner circumferential surface 121a and the inner circumferential surface 122a.

Because the gob $G_G$ is formed into the disk shape before the heat transfers from the gob $G_G$ to the first die 121 and the second die 122, a temperature distribution of the formed molten glass becomes substantially even. Therefore, in cooling the molten glass, the shrinkage quantity of the glass material has the small distribution, and the large deformation is unlikely to occur. Accordingly, the flatness of the principal surface of the prepared sheet glass material G is improved compared with the sheet glass material prepared by the conventional press forming, and the target flatness of the principal surface necessary as the glass substrate for magnetic disk can be realized.

The surface roughness of the inner circumferential surface 121a and the surface roughness of the inner circumferential surface 122a can be adjusted such that the arithmetic average roughness Ra of the sheet glass material G becomes 0.01 μm to 10 μm, preferably 0.01 μm to 1 μm.

Here, generally, when a pressing unit sandwiches the gob $G_G$ while being not moved in the direction of drop of the gob $G_G$, relative speed of the gob $G_G$ to the pressing unit is high. Then, because the gob $G_G$ is sandwiched while moving in the vertical direction, the manufactured sheet glass material G has a shape of which length in the vertical direction is greater than the length in the horizontal direction.

By contrast, in the present embodiment, the gob $G_G$ is sandwiched while the pressing unit is moved in the direction of drop of the gob $G_G$ at the timing when the gob $G_G$ enters the pressing unit. Thus, relative speed of the gob $G_G$ to the pressing unit is lower. This allows roundness of the manufactured sheet glass material G to be improved. With the improvement of roundness of the manufactured sheet glass material G, machining allowance can be decreased in the later-described chamfering process and occurrence of cracks is suppressed in the grinding and polishing processes.

Preferably, the pressing unit is moved in the direction of drop of the gob $G_G$ at the timing when the pressing unit and the gob $G_G$ contact such that speed of the pressing unit is equal to that of the dropping gob $G_G$, that is, relative speed of the gob $G_G$ to the pressing unit is zero.

(b) Scribing Process

Next, scribing process (Step 20) will be explained. After the press forming, scribing is performed to the formed sheet glass material G in the scribing process.

As used herein, the scribing means that two concentric (inside concentric and outside concentric) cutting-plane lines (scratch in the form of a line) are provided in the surface of the sheet glass material G with a scriber made of a super alloy or diamond particles in order to obtain the ring-shape of the formed sheet glass material G having a predetermined size. The sheet glass material G scribed into two-concentric-circle shape is partially heated, and a portion outside the outside concentric circle and a portion inside the inside concentric circle are removed utilizing a difference in thermal expansion of the sheet glass material G, thereby obtaining the ring-shaped sheet glass material.

Note that a sheet glass material may be processed to have an outer diameter and uniformity, the degree of which scribing is not required for, and the ring-shaped sheet glass material may be obtained by forming an inner hole with a coring machine (drill) to the above sheet glass material.

(c) Shape Processing Process (Chamfering Process)

Next, a shape processing process (Step S30) will be explained. Then shape processing is performed to the scribed sheet glass material G. The shape processing includes chamfering (chamfering of outer circumferential end portion and inner circumferential end portion).

The outer circumferential end portion and inner circumferential end portion of the ring-shaped sheet glass material G are chamfered using diamond abrasive grains.

(d) Grinding Process using Fixed Abrasive Grains

Next, a grinding process using fixed abrasive grains (Step S40) will be explained. In the grinding process using fixed abrasive grains, grinding is performed to the ring-shaped sheet glass material G using the fixed abrasive grains. For example, in the grinding using the fixed abrasive grains, machining allowance is several µm to about 100 µm. For example, the fixed abrasive grains have the particle size of about 10 µm.

Figure 5A:
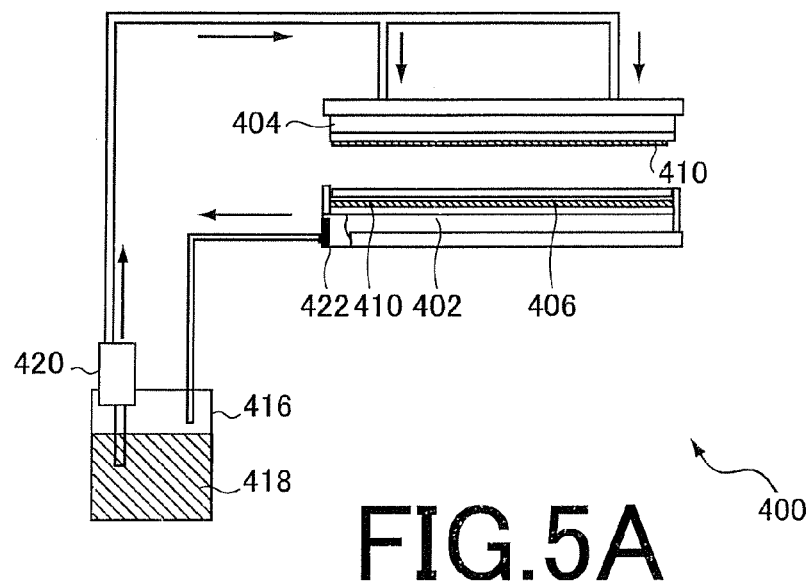
FIG. 5A is an overall view of an apparatus used to perform grinding using fixed abrasive grains.
Figure 5B:
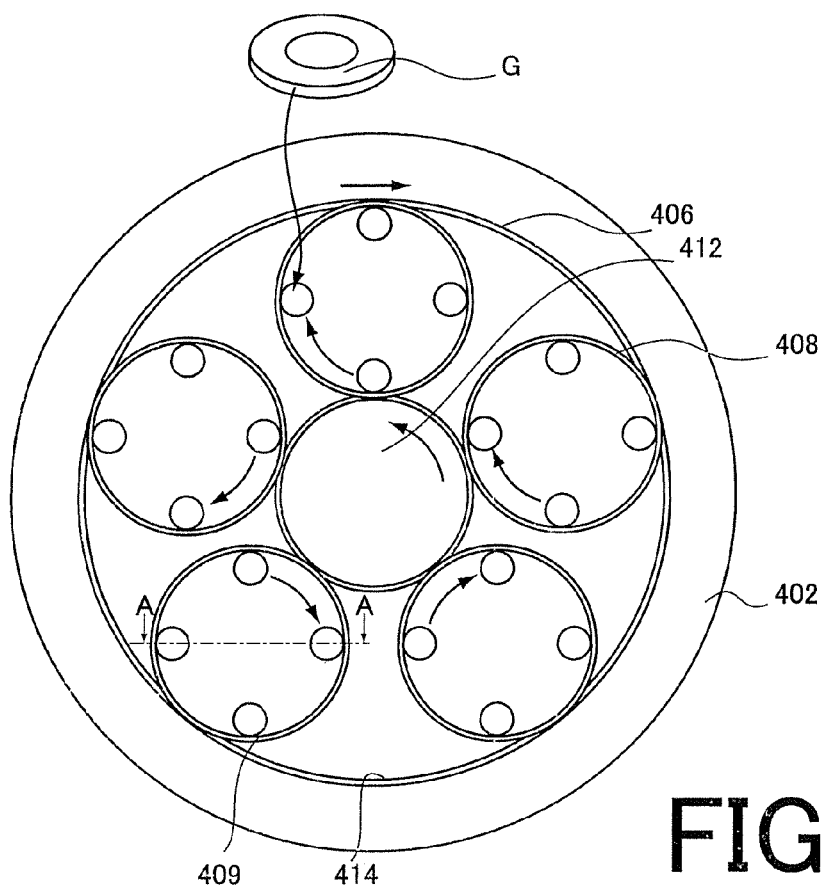
FIG. 5B is a view illustrating a carrier used in the apparatus of FIG. 5A.
Figure 6:
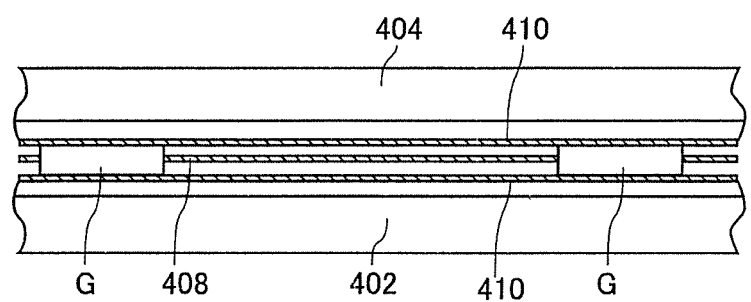
FIG. 6 is a view illustrating an arrangement in which a sheet glass material is ground.

Here, with reference to FIGS. 5A, 5B, and 6, the process for grinding the sheet glass material G will be explained. FIG. 5A is an overall view of an apparatus used to perform grinding using fixed abrasive grains. FIG. 5B is a view illustrating a carrier used in the apparatus of FIG. 5A. FIG. 6 is a view illustrating an arrangement in which a sheet glass material G is ground.

As illustrated in FIG. 5A and FIG. 6, an apparatus 400 includes a lower surface plate 402, an upper surface plate 404, an internal gear 406, a carrier 408, a diamond sheet 410, a sun gear 412, an internal gear 414, a reservoir 416, and a pump 420. The reservoir 416 includes coolant 418.

In the apparatus 400, the internal gear 406 is vertically sandwiched between the lower surface plate 402 and the upper surface plate 404. During the grinding, the plural carriers 408 are retained in the internal gear 406. In an example illustrated in FIG. 5B, the internal gear 406 retains the five carriers 408.

The surface of the diamond sheet 410 bonded to the lower surface plate 402 and the upper surface plate 404 in a planar manner constitutes a grinding surface. That is, the sheet glass material G is ground with the fixed abrasive grains using the diamond sheet 410.

As illustrated in FIG. 5B, the plural sheet glass materials G to be ground is retained while disposed in a circular hole provided in each carrier 408. During the grinding, the pair of principal surfaces of the sheet glass material G abuts on the diamond sheet 410 while being sandwiched between the lower surface plate 402 and the upper surface plate 404.

On the other hand, the sheet glass material G is retained on the lower surface plate 402 by the carrier 408 that includes a gear 409 in its outer circumference. The carrier 408 engages with the sun gear 412 and internal gear 414, which are provided in the lower surface plate 402. When the sun gear 412 is rotated in an arrow direction, each carrier 408 revolves around the sun gear 412 while rotating in an arrow direction as a planet gear. Therefore, the sheet glass material G is ground using the diamond sheet 410.

As illustrated in FIG. 5A, in the apparatus 400, a pump 420 supplies the coolant 418 in the reservoir 416 to the upper surface plate 404, and the pump 420 recovers the coolant 418 from the lower surface plate 402 to return the coolant 418 to the reservoir 416, thereby circulating the coolant 418. At this point, the coolant 418 removes swarf generated in the grinding from the grinding surface. Specifically, in the apparatus 400, when the coolant 418 is circulated, the filter 422 provided in the lower surface plate 402 filtrates the coolant 418 to retain the swarf in the filter 422.

In the grinding apparatus 400, the grinding is performed using the diamond sheet 410. Alternatively, the fixed abrasive grains of the diamond particles may be used instead of the diamond sheet 410. For example, a pellet that is formed by binding the diamond particles with a resin can be used in the grinding using the fixed abrasive grains.

(e) Edge Polishing Process

Next, an edge polishing process (Step S50) will be explained. In the edge polishing process, edge polishing is performed to the sheet glass material G.

In the edge polishing, mirror surface finishing is performed to an inner-circumferential-side end face and an outer-circumferential-side end face of the sheet glass material G by brush polishing. At this point, slurry that includes fine particles such as cerium oxide as the loose abrasive grains is used. The contamination of dust and damage such as a flaw are removed by performing the edge polishing. Therefore, generation of ions such as a sodium and potassium which cause corrosion can be prevented.

(f) First Polishing (Principal Surface Polishing) Process

Next, a first polishing process (Step S60) will be explained. In the first polishing process after the edge polishing process, the first polishing is performed to the ground principal surface of the sheet glass material G. For example, machining allowance in the first polishing is several µm to about 50 µm.

The first polishing is intended to remove the flaw left on the principal surface after the grinding using the fixed abrasive grains and the deformation. The apparatus 400 used in the grinding (Step S40) using the fixed abrasive grains is used in the first polishing. At this point, the first polishing differs from the grinding using the fixed abrasive grains in the following points. That is, in the first polishing process, the slurry of the turbid loose abrasive grains is used instead of the fixed abrasive grains. In the first polishing process, the coolant is not used. In the first polishing process, the resin polisher is used instead of the diamond sheet 410.

For example, the slurry of the turbid fine particles such as cerium oxide (particle size: diameter of about 1 µm to about 2 µm) is used as the loose abrasive grains used in the first polishing.

(g) Chemically Strengthening Process

Next, a chemically strengthening process (Step S70) will be explained. In the chemically strengthening process after the first polishing process, the first polished sheet glass material G is chemically strengthened.

For example, a mixed solution of potassium nitride (60%) and sodium sulfate (40%) can be used as a chemically strengthening solution. In the chemically strengthening, for example, the chemically strengthening solution is heated to 300° C. to 400° C., the washed sheet glass material G is pre-heated to 200° C. to 300° C., and the sheet glass material G is dipped in the chemically strengthening solution for three to four hours. Preferably, in order that the whole principal surfaces of the sheet glass material G are chemically strengthened, the dipping is performed while the plural sheet glass materials G are accommodated in a holder by retaining the sheet glass materials G at the end faces.

When the sheet glass material G is dipped in the chemically strengthening solution, the lithium ion and the sodium ion in the surface layer of the sheet glass material G are replaced by the sodium ion and the potassium ion which have relatively large ion radiuses in the chemically strengthening solution, respectively, thereby strengthening the sheet glass material G.

The sheet glass material G to which the chemically strengthening treatment is performed is washed. For example, after washing the sheet glass material G using the sulfuric acid, the sheet glass material G is washed using pure water and IPA (isopropyl alcohol).

(h) Second Polishing (Final Polishing) Process

Next, a second polishing process (Step S80) will be explained. In the second polishing process, the second polishing is performed to the sheet glass material G after being chemically strengthened and well washed. For example, machining allowance in the second polishing is about 1 µm.

The second polishing is intended to perform mirror surface polishing to the principal surface. The apparatus 400 that is used in the grinding (Step S40) using the fixed abrasive grains and the first polishing (Step S60) is used in the second polishing. The second polishing differs from the first polishing in terms of the kind and particle size of the loose abrasive grains, and hardness of the resin polisher.

For example, the slurry of the turbid fine particles such as colloidal silica (particle size: diameter of about 0.1 µm) is used as the loose abrasive grains used in the second polishing.

The polished sheet glass material G is then washed. A neutral detergent, pure water, and IPA are used in the washing.

The glass substrate for magnetic disk 2 having the surface irregularity, in which the flatness of the principal surface is 4 µm or less and the roughness of the principal surface is 0.2 nm or less, is obtained by the second polishing.

Then, as illustrated in FIG. 1, the magnetic layers 3A and 3B are deposited to the glass substrate for magnetic disk 2 to prepare the magnetic disk 1.

The flow of the manufacturing method illustrated in FIG. 2 is described above. In the flow of FIG. 2, the scribing (Step S20) and the shape processing (Step S30) are performed between the grinding using the fixed abrasive grains (Step S40) and the first polishing (Step S60), and the chemically strengthening (Step S70) is performed between the first polishing (Step S60) and the second polishing (Step S80). However the sequence is not limited to the embodiment described above. As long as the grinding using the fixed abrasive grains (Step S40), the first polishing (Step S60), and the second polishing (Step S80) are performed in this order, the scribing (Step S20), the shape processing (Step S30), and the chemically strengthening (Step S70) may appropriately be reordered.

In the present embodiment, the two-time grinding (first grinding and second grinding) is not performed to the formed sheet glass material G using the loose abrasive grains unlike the conventional method, but the first polishing and the second polishing is performed to the formed sheet glass material G after the one-time grinding is performed using the fixed abrasive grains. The reason the one grinding process can be omitted is that the sheet glass material of which principal surface has the target flatness as the magnetic disk glass substrate can be formed.

The machining allowance in the conventional grinding (first grinding process and second grinding process) and the polishing (first polishing process and second polishing process) exceeds 150 µm in order to resolve the low level of the flatness of the formed sheet glass material. That is, the machining allowance is set larger in the conventional first grinding process and second grinding process. When the sheet glass material G is largely ground, the crack deeply proceeds while the flatness is improved.

Therefore, the machining allowance is inevitably increased in the first polishing and the second polishing. The "roll-off problem" of the edge portion, in which the neighborhood of the outer circumferential edge portion is rounded in the glass substrate, is caused by the large machining allowance in the polishing. The neighborhood of the outer circumferential edge portion is rounded because of the fact that the hard or soft resin polisher is used in performing the first polishing and the second polishing.

In the method of the embodiment, the principal surface of the formed sheet glass material is ground using the fixed abrasive grains, and the first polishing can be performed to the ground principal surface of the sheet glass material. Therefore, in the method of the embodiment, the machining allowance can be decreased in the grinding, and consequently the machining allowance can be set to the range of 10 µm to 150 µm in the grinding, the first polishing, and the second polishing.

Further, in the present embodiment, the gob $G_G$ is sandwiched while the pressing unit is moved in the direction of drop of the gob $G_G$. This allows roundness of the sheet glass material G to be improved, and consequently, occurrence of cracks can be suppressed in the grinding and polishing processes.

(Modification 1)

Next, a manufacturing method of a glass substrate for magnetic disk according to the modification 1 will be explained. The manufacturing method of a glass substrate for magnetic disk according to the present modification is different from the above embodiment in a press forming process. The other processes are the same as those described in the above embodiment, and explanations of the other processes are therefore omitted. With now reference to FIGS. 7A to 7C, the press forming process of the present modification will be explained. FIG. 7A is a side view illustrating an arrangement in the present modification before the molten glass $L_G$ and a cutting unit 160 contact. FIG. 7B is a side view illustrating an arrangement in the present modification after the cutting unit 160 cut the molten glass $L_G$. FIG. 7C is a side view illustrating an arrangement in the present modification when the pressing unit 120 performs press forming for a lump of the molten glass $G_G$.

The apparatus 101 further includes a gob forming die 180. The gob forming die 180 includes two blocks 181, 182. Each block 181, 182 is formed with a recess on the top surface, and a recess 180c is therefore formed on the top surface of the gob forming die 180 by closing two blocks 181, 182.

As illustrated in FIG. 7A, the molten glass material $L_G$ continuously flows out from the molten glass outflow port 111. The blocks 181 and 182 are closed on the path of the molten glass $L_G$, and the lump of the molten glass $L_G$ cut with the cutting unit 160 is then received by the recess 180c.

As illustrated in FIG. 7B, the cutting unit 160 is driven at predetermined timing, and the molten glass material $L_G$ is cut with the first cutting blade 161 and the second cutting blade 162. Then, cut molten glass is received by the gob forming die 180, and becomes substantially spherical gob $G_G$ due to the surface tension of the molten glass. Subsequently, the blocks 181 and 182 are opened, and the gob $G_G$, which is formed in the recess 180c, drops vertically downward.

Likewise, in the present modification, the first driving unit 123 and the second driving unit 124 are driven such that the first die 121 and the second die 122 sandwich the gob $G_G$ while moving in the direction of drop of the gob $G_G$ at the timing when the gob $G_G$ enters a gap between the first die 121 and the second die 122. More specifically, the first die 121 moves in the direction of an arrow indicated as "A" in FIG. 7B. The second die 122 moves in the direction of an arrow indicated as "B" in FIG. 7B. This allows the gob $G_G$ to be captured (caught) between the first die 121 and the second die 122, as illustrated in FIG. 7C.

According to the present modification, the gob can be formed with the gob forming die 180, even when, due to small viscosity of the molten glass $L_G$, it is difficult to form substantially spherical shape only by cutting the molten glass $L_G$ with the cutting unit 160.

Further, the pressing unit sandwiches the gob $G_G$ while being moved in the direction of drop of the gob $G_G$. Thus, relative speed of the gob $G_G$ to the pressing unit is lower. Consequently, roundness of the sheet glass material G is improved, and machining allowance can be decreased in the chamfering process. Occurrence of cracks is suppressed in the grinding and polishing processes.

(Modification 2)

Next, a manufacturing method of a glass substrate for magnetic disk according to the modification 2 will be explained. The manufacturing method of a glass substrate for magnetic disk according to the present modification is different from the above embodiment in a press forming process. The other processes are the same as those described in the above embodiment, and explanations of the other processes are therefore omitted.

With now reference to FIGS. 8A to 8D, the press forming process of the present modification will be explained. Each of FIGS. 8A and 8B is a side view illustrating an arrangement before a lump of molten glass $G_G$ is made. FIG. 8C is a side view illustrating an arrangement in the present modification when the lump of molten glass $G_G$ is made with a gob forming die 180. FIG. 8D is a side view illustrating an arrangement when the pressing unit 120 performs press forming for the lump of molten glass $G_G$.

Same as the modification 1, the apparatus 101 includes a gob forming die 180. Unlike the above-described embodiment, the apparatus 101 according to the present medication does not include the cutting unit 160.

As illustrated in FIG. 8A, the molten glass $L_G$ continuously flows out from the molten glass outflow port 111. The blocks 181 and 182 are closed on the path of the molten glass $L_G$, and the lump of the molten glass $L_G$ cut with the cutting unit 160 is then received by the recess 180c.

Next, as illustrated in FIG. 8B, the blocks 181, 182 are rapidly moved at predetermined timing, and the molten glass $L_G$ is cut. Then, cut molten glass is received by the gob forming die 180, and becomes substantially spherical gob $G_G$ due to the surface tension of the molten glass. Subsequently, the blocks 181 and 182 are opened, and the gob $G_G$, which is formed in the recess 180c, drops vertically downward.

Likewise, in the present modification, the first driving unit 123 and the second driving unit 124 are driven such that the first die 121 and the second die 122 sandwich the gob $G_G$ while moving in the direction of drop of the gob $G_G$ at the timing when the gob $G_G$ enters a gap between the first die 121 and the second die 122. More specifically, the first die 121 moves in the direction of an arrow indicated as "A" in FIG. 8B. The second die 122 moves in the direction of an arrow indicated as "B" in FIG. 8C. This allows the gob $G_G$ to be captured (caught) between the first die 121 and the second die 122, as illustrated in FIG. 8D.

According to the present modification, the gob can be formed without using the cutting unit 160, and thus a cut mark caused by the cutting unit 160 is not formed on the gob Consequently, a sheer mark that originates from the cut mark is not formed on the sheet glass material.

Further, the pressing unit sandwiches the gob $G_G$ while being moved in the direction of drop of the gob $G_G$. Thus, relative speed of the gob $G_G$ to the pressing unit is lower. Consequently, roundness of the sheet glass material G is improved, and machining allowance can be decreased in the chamfering process. Occurrence of cracks is suppressed in the grinding and polishing processes.

(Modification 3)

Next, a manufacturing method of a glass substrate for magnetic disk according to the modification 3 will be explained. The manufacturing method of a glass substrate for magnetic disk according to the present modification is different from the above embodiment in a press forming process. The other processes are the same as those described in the above embodiment, and explanations of the other processes are therefore omitted. With now reference to FIGS. 9A to 9C, the press forming process of the present modification will be explained. In the present modification, instead of the gob $G_G$, a lump of optical glass $C_P$, which is heated in a softening furnace (not illustrated), is pressed. FIG. 9A is a side view illustrating an arrangement before dropping a lump of optical glass. FIG. 9B is a side view illustrating an arrangement in which a lump of optical glass is dropping. FIG. 9C is a side view illustrating an arrangement when the pressing unit performs press forming for a lump of optical glass.

The apparatus 101 includes a glass material holding mechanism 112. As illustrated in FIG. 9A, the glass material holding mechanism 112 holds and move the lump of optical glass $C_P$, which is heated in a softening furnace, to the top of the pressing unit 120.

As illustrated in FIG. 9B, the glass material holding mechanism 212 releases the lump of optical glass $C_P$ to drop the lump of optical glass $C_P$ in the vertically downward direction.

Likewise, in the present modification, the first driving unit 123 and the second driving unit 124 are driven such that the first die 121 and the second die 122 sandwich the optical glass $C_P$ while moving in the direction of drop of the optical glass $C_P$ at the timing when the optical glass $C_P$ enters a gap between the first die 121 and the second die 122. More specifically, the first die 121 moves in the direction of an arrow indicated as "A" in FIG. 9B. The second die 122 moves in the direction of an arrow indicated as "B" in FIG. 9B. This allows the lump of optical glass $C_P$ to be captured (caught) between the first die 121 and the second die 122, as illustrated in FIG. 9C.

According to the present modification, when pressing a lump of optical glass $C_P$ that is heated in the softening furnace, the pressing unit sandwiches the optical glass $C_P$ while being moved in the direction of drop of the optical glass $C_P$. Thus, relative speed of the optical glass $C_P$ to the pressing unit is lower. Consequently, roundness of the sheet glass material G is improved, and machining allowance can be decreased in the chamfering process. Occurrence of cracks is suppressed in the grinding and polishing processes.

EXAMPLES

Simulations and experimental results will be explained below to verify the effect of the present inventions with reference to Examples and Comparative Examples.

Examples 1 to 9 and Comparative Examples 1 to 9

Sheet glass materials G were manufactured through the press forming process according to the first embodiment that was explained with reference to FIG. 4. A gob $G_G$ that was heated in a softening furnace was dropped in the vertically downward direction. The pressing unit was moved in the vertically downward direction immediately before the pressing, and the gob $G_G$ was then pressed. $V_G$ denotes speed of the gob $G_G$ in the direction of drop of the gob immediately before the pressing, while $V_M$ denotes speed of the pressing unit in the direction of drop of the gob. Roundness of the sheet glass material G was measured when pressing the gob $G_G$ while changing $V_G$ and $V_M$ as shown in the below Table 1 and Table 2. The measured roundness is as shown in Table 1 and Table 2.

TABLE 1

|  | EX. 1 | EX. 2 | EX. 3 | EX. 4 | EX. 5 | EX. 6 | EX. 7 | EX. 8 | EX. 9 |
|---|---|---|---|---|---|---|---|---|---|
| $V_G$ (m/s) | 2 | 3 | 4.5 | 2 | 3 | 4.5 | 2 | 3 | 4.5 |
| $V_M$ (m/s) | 2 | 3 | 4.5 | 1 | 2 | 3.5 | 3 | 4 | 5.5 |
| Roundness (μm) | 8 | 9 | 8 | 12 | 12 | 13 | 13 | 11 | 13 |

EX.: Example

TABLE 2

|  | CE. 1 | CE. 2 | CE. 3 | CE. 4 | CE. 5 | CE. 6 | CE. 7 | CE. 8 | CE. 9 |
|---|---|---|---|---|---|---|---|---|---|
| $V_G$ (m/s) | 2 | 3 | 4.5 | 2 | 3 | 4.5 | 2 | 3 | 4.5 |
| $V_M$ (m/s) | 0 | 0 | 0 | −2 | −4 | −8 | 10 | 10 | 10 |
| Roundness (μm) | 30 | 50 | 100 | 90 | 200 | 500 | 250 | 210 | 130 |

CE.: Comparative Example

As shown in Table 2, with the Comparative Examples 1 to 9, relative speed of the gob $G_G$ and the pressing unit was 2 m/s or greater immediately before the pressing. Then, roundness of the sheet glass material G was large. Particularly, it was understood that rounds was larger as the relative speed of the gob $G_G$ and the pressing unit was higher.

By contrast, as shown in Table 1, with the Examples 1 to 9, the pressing unit was moved in the vertically downward direction immediately before the pressing, and relative speed of the gob $G_G$ and the pressing unit was 1 m/s or less. Therefore, roundness of the sheet glass material G of the Examples 1 to 9 was smaller than that of the Comparative Examples 1 to 9. According to the Examples 1 to 9, it is possible to manufacture the sheet glass material G excellent in roundness.

Examples 1, 10 to 12 and Comparative Examples 1, 10 and 11

Sheet glass materials G were manufactured through the press forming process according to the first embodiment that was explained with reference to FIG. 4. In each Example and each Comparative Example, viscosity of the gob $G_G$ was changed by changing temperature of the gob $G_G$.

Table 3 shows speed $V_G$ of the gob $G_G$ in the direction of drop of the gob $G_G$ immediately before the pressing, speed $V_M$ of the pressing unit in the direction of drop of the gob, viscosity of the gob $G_G$, and measured roundness.

TABLE 3

|  | EX. 10 | EX. 1 | EX. 11 | EX. 12 | CE. 1 | CE. 10 | CE. 11 |
|---|---|---|---|---|---|---|---|
| $V_G$ (m/s) | 2 | 2 | 2 | 2 | 2 | 2 | 2 |
| $V_M$ (m/s) | 2 | 2 | 2 | 2 | 0 | 0 | 0 |
| Viscosity (poise) | 1,050 | 900 | 700 | 500 | 900 | 700 | 500 |
| Roundness (μm) | 8 | 8 | 8 | 8 | 30 | 50 | 100 |

EX.: Example,
CE.: Comparative Example

As shown in Table 3, in the Comparative Examples 1, 10 and 11, as viscosity of the gob $G_G$ is smaller, roundness of the sheet glass material G was larger. By contrast, in the Examples 1, 10 to 12, even when viscosity of the gob $G_G$ was small, roundness of the sheet glass material G was not larger. The pressing unit is moved in the vertically downward direction immediately before the pressing so that relative speed of the gob $G_G$ and the pressing unit is zero. Then, even when pressing the gob $G_G$ of which viscosity is as small as 500 to 700 poise, for example, it is possible to manufacture the sheet glass material G excellent in roundness.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alternations could be made hereto without departing from the spirit and scope of the invention.

What is claimed is:

1. A manufacturing method of a sheet glass material for a magnetic disk including a pair of principal surfaces, the method comprising:
    performing a cutting process for cutting molten glass to cause a lump of molten glass to drop; and
    performing a pressing process for obtaining a sheet glass material by sandwiching simultaneously the dropping lump from both sides of the dropping path of the lump with surfaces of a pair of dies facing together, and performing press forming on the lump; such that the press forming sandwiches the lump while moving the pair of dies in a vertical direction so that a relative velocity of the lump to that of the pair of dies decreases.

2. The manufacturing method of a sheet glass material for a magnetic disk according to claim 1, wherein the relative velocity of the lump to that of the pair of dies is substantially zero.

3. The manufacturing method of a sheet glass material for a magnetic disk according to claim 1, wherein temperatures of the pair of dies are lower than a strain point of the glass.

4. The manufacturing method of a sheet glass material for a magnetic disk according to claim 1, wherein the glass contains, as converted based on the oxide, denoted as molar percentages: 50 to 75% $SiO_2$, 1 to 15% $Al_2O_3$, totally 5 to 35% at least one component selected from the group of $Li_2O$, $Na_2O$, and $K_2O$, totally 0 to 20% at least one component selected from the group of MgO, CaO, SrO, BaO, and ZnO, and totally 0 to 10% at least one component selected from the group of $ZrO_2$, $TiO_2$, $La_2O_3$, $Y_2O_3$, $Ta_2O_5$, $Nb_2O_5$, and $HfO_3$.

5. The manufacturing method of a sheet glass material for a magnetic disk according to claim 1, wherein viscosity of the molten glass ranges from 500 poise to 1,050 poise.

6. A manufacturing method of a glass substrate for a magnetic disk, the method comprising
    performing a cutting process for cutting molten glass to cause a lump of molten glass to drop;
    performing a pressing process for obtaining a sheet glass material by sandwiching simultaneously the dropping lump from both sides of the dropping path of the lump with surfaces of a pair of dies facing together, and performing press forming on the lump such that the press forming sandwiches the lump while moving the pair of dies in a vertical direction so that a relative velocity of the lump to that of the pair of dies decreases;
    performing a grinding process for grinding principal surfaces of the sheet glass material obtained with the pressing process using fixed abrasive grains; and performing a polishing process for polishing the principal surfaces using loose abrasive grains after the grinding process.

* * * * *